July 17, 1934.                G. HARRIS                1,966,893
CARGO NET
Filed Dec. 23, 1932
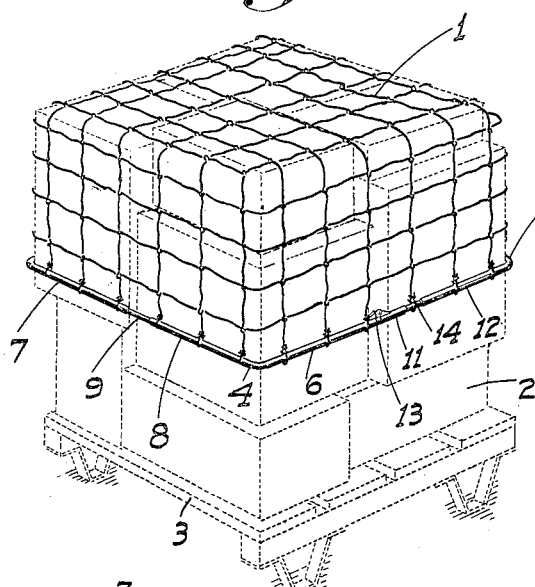
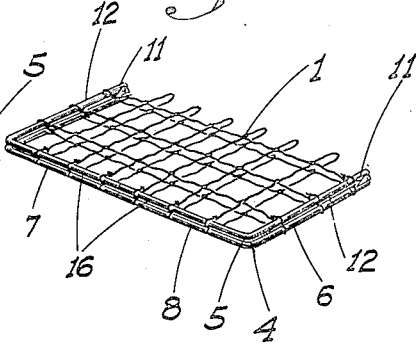
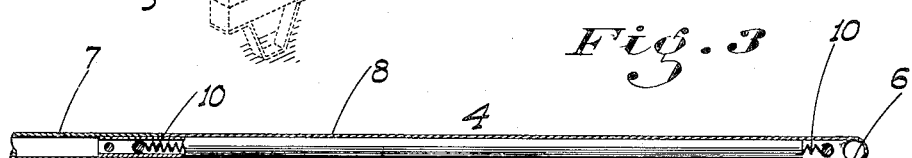
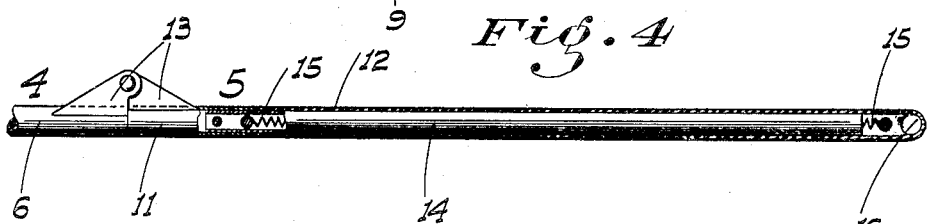
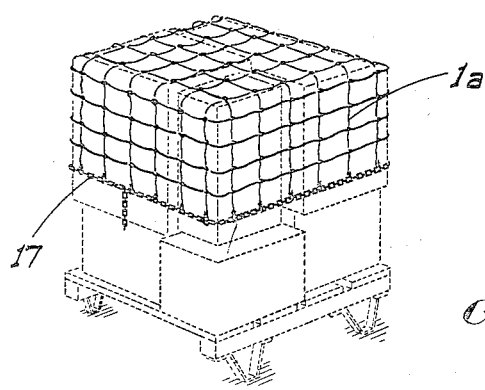
INVENTOR
George Harris
ATTORNEY // Patented July 17, 1934

1,966,893

UNITED STATES PATENT OFFICE 1,966,893

CARGO NET

George Harris, Stockton, Calif.

Application December 23, 1932, Serial No. 648,633

8 Claims. (Cl. 294—67)

This invention relates to nets used in connection with the safeguarding of cargo against falling, to hold the same in place on the flats when the latter are being moved along the wharf or pier from shipside to the cars or point of land unloading, or vice versa.

These flats which are now commonly used are portable platforms on which the cargo is piled for movement as above stated; the flats when loaded being lifted bodily and transported to the point of unloading by specially built tractors. The flooring over which these tractors travel is usually rough, so that the cargo on the flats, which is apt to be boxes of various sizes and odd shapes, is jounced about and the individual boxes tend to fall off. If this happens breakage and damage is liable to result, and in any event time is lost in picking up and restacking the cargo. These conditions are realized and attempts are sometimes made to prevent shifting and dropping of the cargo by throwing a loose net over the same and tying a line about the net and cargo. This takes considerable time however, and since it has been proved to be inefficient it is very seldom resorted to.

The principal object of my invention is to provide a net for the above purpose so constructed that the cargo tending to shift and drop off the flat is prevented from so doing, and the individual units of the cargo are maintained in properly close relation to each other on the flat.

A further object is to construct the net so that it may be easily placed over the cargo and when so placed nothing further need be done to maintain it in place and cause it to function as intended.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective view of the preferred form of net as applied about the cargo on a flat.

Fig. 2 is a similar view of the net detached and folded.

Fig. 3 is a fragmentary longitudinal section of one end of the frame.

Fig. 4 is a similar view of one side of the frame.

Fig. 5 is a perspective view showing a modified form of net frame, the net being applied about a cargo.

Referring now more particularly to the characters of reference on the drawing, the net 1 is woven from line of suitable size and with a large mesh, so as to have the general form of a rectangular basket, as shown in Fig. 1; and large enough to fit over the cargo 2 disposed on a flat 3.

A special rectangular frame extends about the perimeter of the net, and consists of two units 4 and 5 hinged together for folding, each unit comprising a number of separate sections. The unit 4 comprises a pair of tubular opposed side bar sections 6, substantially one-half the length of the net and bent at one end at right angles to form end sections 7 and 8 alined with and projecting toward and normally abutting against each other. A tubular member 9 is secured at one end in the free end of the bar 7 and slidably projects into the adjacent bar 8 to a point near its opposite end, as shown in Fig. 3. A tension spring 10 extends through the member 9, being secured at one end in said member and at the other end in the bar 8 beyond said member, so as to normally hold the bar sections 7 and 8 against each other, while permitting separation of the same.

The other frame unit 5 comprises opposed side bar sections each consisting of separate tubular elements 11 and 12 alined with each other, the elements 11 normally alining with and abutting against the adjacent ends of the bars 6 and being permanently connected thereto by hinges 13. The elements 11 have tubular members 14 secured therein which slidably project into the adjacent elements 12 and extend toward the opposite ends of the same, as shown in Fig. 4. Tension springs 15 are secured at one end to the members 14 and at the other end to the elements 12 beyond said members. This arrangement holds the elements 11 and 12 in permanently rigid alinement but permits separation of the same. The outer ends of the elements 12 are bent at right angles to form end bar sections 16 which are connected together in the same manner as the opposite end bar sections 7 and 8.

By means of the above construction it will be seen that the frame, which is relatively heavy, exerts a constant down pull on the flexible net supported by the cargo tending to maintain said net in firm pressing contact with the cargo. As the individual units of the cargo are jounced up and down with the passage of the flat over rough surfaces this pressing action of the net causes the units to be constantly crowded close against each other, so that any tendency of the same to move laterally and outwardly and drop off is positively eliminated. The yieldable telescopic construction of the frame allows the sides of the same to be altered merely by pulling the sections apart so that the frame may fit about cargos of varying horizontal areas. The hinged connection of the frame units enables the same to be folded up into a relatively compact form so that it is convenient to handle. The net may be placed over the cargo by one man. The frame is of course unfolded and after being lifted to a superimposed position relative to the cargo is lowered about the same. If expansion of the frame is necessary to permit it to fit about the cargo this can be easily done by the operator manipulating the frame in an obvious manner.

The same results may be obtained by using a chain 17 as a frame about the net 1a as in Fig. 5. In this case the ends of the chain are detachably connected so that its operative length may be shortened or lengthened as the size of the cargo may require. The chain type of frame lacks the rigidity of the bar frame and is not so easy to apply, but it has the same advantages as far as exerting a downward pull on the net itself is concerned, so as to hold the net closely about the cargo.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A cargo net comprising a flexible net member woven to a basket like form, and a rigid frame about the perimeter of the net consisting of separate units, and means hinging said units together for folding movement.

2. A cargo net comprising a flexible net member woven to a basket like form, and a rigid frame about the perimeter of the net consisting of separate units, hinged together for folding movement, said units each comprising separate members slidably connected together whereby the operative size of the frame may be altered.

3. A structure as in claim 2, with spring means enclosed within the frame to yieldably resist separating sliding movement of the members.

4. A retaining net comprising flexible cords woven into basketlike form and adapted to be disposed in inverted position over a load consisting of a number of individual pieces of merchandise, and a frame about the perimeter of the net, such frame being of such a weight that when the net is placed in inverted position over the load such frame will exert a constant downward pull on the cords of the net sufficient to hold them in taut contact with the load at all points.

5. A retaining net comprising flexible cords woven into basketlike form and adapted to be disposed in inverted position over a load consisting of a number of individual pieces of merchandise, the perimeter of the net being uniformly weighted to a degree whereby it will exert a constant downward pull on the cords of the net when the net is placed in inverted position over the load sufficient to pull the flexible cords into taut contact with the load at all points.

6. A retaining net comprising flexible cords woven into basketlike form and adapted to be disposed in inverted position over a load consisting of a number of individual pieces of merchandise, and a flexible metal chain forming the perimeter of the net and which chain is of such a weight as to exert a constant downward pull on the cords of the net when the net is placed in inverted position over the load sufficient to pull the flexible cords into taut contact with the load at all points.

7. A retaining net comprising flexible cords woven into basketlike form and adapted to be disposed in inverted position over a load consisting of a number of individual pieces of merchandise, a frame about the perimeter of the net, such frame comprising rigid angular members slidably associated together whereby the operative size of the frame may be varied.

8. A device as in claim 6 with yieldable means acting to normally hold the members against sliding movement.

GEORGE HARRIS.